United States Patent [19]
Kinnunen et al.

[11] Patent Number: 6,052,557
[45] Date of Patent: *Apr. 18, 2000

[54] DIRECT MODE REPEATER IN A MOBILE RADIO SYSTEM

[75] Inventors: Kimmo Kinnunen, Jyväskylä; Osmo Schroderus, Sumiainen, both of Finland

[73] Assignee: Nokia Telecommunication Oy, Espoo, Finland

[*] Notice: This patent issued on a continued prosecution application filed under 37 CFR 1.53(d), and is subject to the twenty year patent term provisions of 35 U.S.C. 154(a)(2).

[21] Appl. No.: 08/704,511
[22] PCT Filed: Jan. 11, 1996
[86] PCT No.: PCT/FI96/00025
§ 371 Date: Sep. 12, 1996
§ 102(e) Date: Sep. 12, 1996
[87] PCT Pub. No.: WO96/22001
PCT Pub. Date: Jul. 18, 1996

[30] Foreign Application Priority Data
Jan. 12, 1995 [FI] Finland ..................................... 950141

[51] Int. Cl.⁷ .................................................. H04B 17/02
[52] U.S. Cl. ................................ 455/9; 455/7; 455/11.1; 370/337; 370/347; 370/445; 370/461
[58] Field of Search .................................. 455/9, 7, 11.1, 455/17–18, 16, 62, 63, 67.1, 67.3, 447, 452, 455, 516, 518, 528, 510; 370/327, 329, 330, 337, 347, 445, 447, 458, 461

[56] References Cited
U.S. PATENT DOCUMENTS

| | | |
|---|---|---|
| 4,129,755 | 12/1978 | Murakami ............................... 370/337 |
| 4,479,245 | 10/1984 | Batlivala et al. ......................... 455/18 |
| 5,042,083 | 8/1991 | Ichikawa ................................. 370/447 |
| 5,056,152 | 10/1991 | Truby et al. ............................. 455/11 |
| 5,125,101 | 6/1992 | Johnson et al. ............................ 455/9 |
| 5,142,533 | 8/1992 | Crister et al. .......................... 370/461 |
| 5,239,666 | 8/1993 | Truby ......................................... 455/9 |
| 5,475,866 | 12/1995 | Ruthenberg ............................ 455/452 |
| 5,684,801 | 11/1997 | Amitay et al. .......................... 370/447 |

FOREIGN PATENT DOCUMENTS

| | | |
|---|---|---|
| 95 12956 | 5/1995 | WIPO . |
| 95 15623 | 6/1995 | WIPO . |
| 95 24655 | 9/1995 | WIPO . |
| 96 09697 | 3/1996 | WIPO . |

*Primary Examiner*—Lee Nguyen
*Attorney, Agent, or Firm*—Pillsbury Madison & Sutro Intellectual Property

[57] ABSTRACT

A direct mode repeater for forwarding traffic between mobile stations communicating on a direct mode channel, includes a transceiver unit for forwarding radio messages between mobile stations communicating on a direct mode channel, and a control unit for controlling the operation of the repeater and for directing the transceiver unit to the direct mode channel. In order to prevent simultaneous transmission of several repeaters on the same direct mode channel. The transmission on the direct mode channel of the repeater that forwards radio messages on the direct mode channel contains at desired intervals the identifier of the repeater, the identifier indicating that the repeater forwards traffic on the direct mode channel. The the repeater is arranged to monitor the direct mode channel as the repeater is seeking to switch onto the direct mode channel, and to switch onto the direct mode channel only if no identifier from any other repeater has occurred on the direct mode channel during a predetermined monitoring period.

21 Claims, 2 Drawing Sheets

DIRECT MODE REPEATER IN A MOBILE RADIO SYSTEM

This application claims benefit of international application PCT/FI96/00025 filed Jan. 12, 1995.

FIELD OF THE INVENTION

The present invention relates to a method for using repeaters in a mobile radio system comprising a first repeater operating as a repeater, and a second repeater which does not at first operate as a repeater.

BACKGROUND OF THE INVENTION

The invention relates to the field of mobile phone systems. A subscriber in a mobile phone system, i.e. a subscriber station, for instance a mobile phone or a mobile station, may be registered in a radio network or system, whereby it communicates with the radio network via system channels comprised of control and traffic channels maintained by the base stations of the radio network.

In addition to the system channels in mobile phone systems, so-called direct mode channels can also be used in connection with a radio system, i.e. direct mode operation is applied. Subscriber stations using direct mode operation do not communicate directly with the radio network or its base stations. Direct mode channels are frequencies on which mobile phones or other means of communication are able to communicate directly with each other without the system, or via repeater stations either with the base stations of the system or with other mobile stations.

Direct mode channels are typically used in situations where, for instance, a group of portable mobile phones are communicating with each other at such a long distance from the base station that system channels cannot be used.

Another important way of using direct mode channels is to increase the capacity when the traffic in the system increases rapidly in some part of the service area of the system, for instance in some point-like part of the radio network.

A direct mode channel is referred to with the terms direct or simplex channel, or a simplex connection. A direct mode channel is a channel which is typically not at all used by the system. For example, it may be a channel with the same channel spacing as the channels of the system, for instance 12.5 kHz or 25 kHz. Among the mobile phones operating on a direct mode channel, the transmitting station has tuned its transmitter to the channel and transmits speech or data information. The other mobile phones set to direct mode operation have tuned their receivers to the same channel, whereby they are able to directly hear the transmission.

Operation on a direct mode channel may take place on the analog or digital modulation principle. A mobile phone transmitting on the channel may also transmit signalling information, such as information on rights of use and priorities or on the group operating on the channel. On the direct mode channel, an encryption may be carried out or plain speech can be transmitted.

Subscriber stations using direct mode operation communicate with other subscriber stations on a direct mode channel without necessarily being in direct contact with the base stations of the radio network. However, the subscriber stations using direct mode operation can also communicate with the radio network via repeater stations. A repeater station is a piece of equipment comprising two radio apparatuses connected to each other. The repeater stations typically comprise two transceivers. The repeater station transmits the information messages transmitted on the direct mode channel to desired network elements, for instance to the base stations of the radio network, these base stations transmitting the information messages further to the switching centres of the radio network. The information messages transmitted by the repeater station may, for example, be speech or consist of data or signalling messages. When a repeater is used, the direct mode channel employs, for example, a semiduplex mode of operation. It should be noted that the repeater station may also be a repeater repeating traffic between mobile stations communicating on the direct mode channel.

It should be noted that, in direct mode operation, the repeaters/repeater stations may also repeat traffic between two mobile stations located within the coverage area of each respective repeater, but not necessarily within the coverage areas of each other.

The U.S. Pat. No. 5,056,152 discloses a vehicular repeater operating as a repeater between a base station and a mobile station of the system. However, the solution described in that U.S. Patent is designed to transmit (i.e. to repeat) on a different frequency than on which the mobile station whose messages are to be repeated is transmitting. Therefore, the solution disclosed in that U.S. Patent is not suitable for repeating/transmitting traffic between mobile stations communicating with each other on the same direct mode channel. According to the solution in accordance with that U.S. Patent, a check is carried out as to whether the repeater frequency is free, by transmitting a signal (tone) on the transmitting frequency of the mobile stations and then monitoring on the repeater frequency whether other repeaters repeat the signal on that frequency or not. In that U.S. Patent, a repeater 2 transmits a signal (tone) on a frequency A, and monitors on a frequency B how many other repeaters repeated that signal. On the basis of this, the repeater 2 calculates a delay V to employ. When a mobile station begins a speech transmission on the frequency A, the repeater 2 is ready to begin repeating the speech transmission on the frequency B after the delay V from the first possible moment of repeating. If another repeater begins repeating before the start of transmission of the repeater 2, the repeater 2 does not repeat the speech but stays in reserve.

The solution according to the above-identified U.S. Patent even forces a repeater reserved for another group to indicate its presence to an active repeater. The same holds true for a repeater belonging to the same group, intending to switch onto a second direct mode channel or to operate as an ordinary mobile station.

A problem in the prior art solutions is that the test transmission (tone) transmitted by the repeater, i.e. the signal for examining whether there are other repeaters on the channel besides the examining one, makes it imperative that the mobile stations be able to interpret the signal in a correct way, that is, to do nothing, because the signal is only a test transmission from a repeater seeking to switch onto the direct mode channel. Furthermore, such a test transmission permits collision of the signal from the repeater and the call set-up of the mobile station. Yet another problem emerges if the repeater seeking to switch onto the channel is transmitting its test transmission, and there are several other repeaters on the channel, all of which repeat the test transmission. This may easily lead to the entire capacity of said channel being reserved for the transmission of test transmissions and the repeated test transmissions. Such a situation is even worse on a direct mode channel having one frequency only.

While operating on a direct mode channel, the repeater station repeats and the mobile stations transmit on the same frequency. Consequently, to employ this frequency for selecting an active repeater station according to the method of U.S. Pat. No. 5,056,152 is not advisable, because that would interfere with the signalling of mobile stations on the direct mode channel.

In case a repeater seeking to switch onto the channel transmits, as in that U.S. Patent, several test messages that the other repeaters repeat, the resulting overlapping operation on the direct mode channel is problematic, particularly in a time division digital system in which the detection of overlapping transmissions is more difficult than in an analog system. The fact is that if two active repeaters accidentally transmit or repeat the test message in the same time slot, the transmission from both the repeaters may be destroyed, and the repeater seeking to switch onto the direct mode channel erroneously infers that there is no repeater on the direct mode channel. In practice, simultaneous operation as repeaters would result in the mobile stations being unable to decode transmission from either of the repeater stations.

The solution to the problems discussed above is to prevent the developing of such problematic situations by the repeater station seeking to switch onto the direct mode channel without checking that the direct mode channel is free for the repeater to operate.

SUMMARY OF THE INVENTION

In is an object of the present invention to make it possible for a repeater switching onto a direct mode channel to find out whether there is already a second repeater in operation on the direct mode channel onto which the repeater seeks to switch. A further object of the invention is to prevent overlapping operation of several repeater stations on the same direct mode channel. Within a specific area, there may only be one direct mode channel operation in progress at a time. The term "direct mode channel operation" here refers to a case where a mobile station is transmitting, a second mobile station (stations) is receiving, and one direct mode channel repeater station is amplifying the transmission of the transmitting mobile station whenever required. Only one active repeater station is allowed on the direct mode channel, because there is space reserved for only one repeater station in the frame structure of the direct mode channel.

This new type of a method for employing direct mode repeaters in a mobile radio system is achieved by a method according to the invention, which is characterized in that it comprises the steps of transmitting from the first repeater an identifier of the first repeater at desired intervals on a direct mode channel, the second repeater monitoring said direct mode channel for at least the time period of the desired interval, and the second repeater shifting to wait state and monitoring the direct mode channel at desired intervals, if the second repeater detects the identifier of the first repeater on the direct mode channel, and the second repeater waiting for the end of transmission from the first repeater before the second repeater begins to operate as a repeater on the direct mode channel.

The invention further relates to a method for using direct mode repeaters in a mobile radio system comprising a first repeater operating as a repeater, and a second repeater which does not at first operate as a repeater. Such a method is characterized by the steps of transmitting from the first repeater an identifier of the first repeater on a first direct mode channel at desired intervals, the second repeater monitoring the first direct mode channel for at least the time period of the desired interval, and the second repeater tuning onto a second direct mode channel, the second repeater starting monitor it, and seeking to begin operating on it as a repeater, if the second repeater detects the identifier of the first repeater on the direct mode channel.

In addition, the invention relates to a method for using direct mode repeaters in a mobile radio system comprising a first repeater operating as the repeater for a first communication group, and a second repeater reserved for a second communication group, which second repeater does not at first operate as a repeater.

Such a method according to the invention is characterized by the steps of transmitting from the first repeater an identifier of the first repeater on a direct mode channel at desired intervals, the second repeater monitoring the direct mode channel for at least the time period of the desired interval, and the second repeater shifting to wait state if the second repeater detects the identifier of the first repeater on the direct mode channel, whereby the second repeater monitors the direct mode channel at desired intervals and waits for the first communication group to leave the direct mode channel, and then begins to operate as the repeater of the second communication group on the direct mode channel.

In addition, the invention relates to a direct mode repeater for forwarding traffic between mobile stations communicating on a direct mode channel, the repeater comprising: a transceiver unit for forwarding radio messages between mobile stations communicating on a direct mode channel, a control unit for controlling the operation of the repeater and for directing the transceiver unit to the direct mode channel.

The repeater station of the invention is characterized in that the transmission on the direct mode channel of the repeater that forwards radio messages on the direct mode channel contains at desired intervals the identifier of the repeater, the identifier indicating that the repeater forwards traffic on the direct mode channel, and the repeater is arranged to monitor the direct mode channel as the repeater is seeking to switch onto the direct mode channel, and to switch onto the direct mode channel only if no identifier from any other repeater has occurred on the direct mode channel during a predetermined monitoring period.

The invention is based on the idea that a (first) S repeater communicating on a direct mode channel transmits its identifier at desired intervals. Correspondingly, prior to starting communication, a second repeater which seeks to switch onto the direct mode channel monitors the direct mode channel for at least the time period of the desired interval, and examines whether the identifier of the first, or any other, repeater occurs on the direct mode channel. If the identifier of the first, or any other, repeater is detected, the repeater does not move onto the direct mode channel but waits for it to become free. Alternatively, if the first repeater is already communicating on the direct mode channel, the second repeater may, instead of the first direct mode channel, tune onto a second direct mode channel, begin to monitor it, and seek to begin operating on it as a repeater.

According to the system and method disclosed in U.S. Pat. No. 5,056,152, the repeater switching onto a direct mode channel operates actively by transmitting test signals on the direct mode channel, whereas in the system according to the present invention the repeater seeking to switch onto the direct mode channel stays to monitor a possible identifier from an active repeater (i.e. one already operating on the direct mode channel), and on the basis of that determines whether it is worth its while to wait for the direct mode channel to become free before switching onto it, or whether to switch onto a second direct mode channel if there is already another repeater on the first direct mode channel.

An advantage of the repeater and the method described herein for using repeaters in a mobile radio system is that when the principles of the invention are complied with, the problems of prior art solutions can be avoided.

It is an advantage of the solution of the present invention, if applied, that traffic on the direct mode channel for signalling purposes is decreased as only the normal identifier of the active repeater station is transmitted on the direct mode channel to the mobile stations and to other repeaters possibly seeking to switch onto the direct mode channel.

A further advantage of the solution according to the invention is that the protocol used therein is less complicated, because a simplex broadcast type of transmission is transmitted from the repeater on the direct mode channel. This transmission does not require an acknowledgement, and it is monitored by other repeaters seeking to switch onto the direct mode channel.

An additional advantage of the invention, if the procedure according to it is followed, is that it makes it possible to avoid overlapping operation of repeaters, i.e. such a case where several repeaters operate simultaneously as repeaters on the same direct mode channel.

Yet another advantage of the solution of the present invention is that it can be implemented so as to save power. If an additional embodiment of the invention is followed, this is due to the fact that a repeater seeking to switch onto a direct mode channel may, if necessary, be in closed/wait state (economy mode) during the interval T, i.e. approximately for the time period at the intervals of which the first repeater on the direct mode channel transmits its identifier. Being in reserve like this only requires from the repeater that it receives at intervals T a signal transmitted on the direct mode channel, that is, the identifer transmitted by the repeater already operating on the direct mode channel. Therefore, the repeater which seeks to switch onto the direct mode channel must monitor the direct mode channel for an appropriate time at intervals T in order to be able to detect the identifier transmitted by the (first) repeater already operating on the direct mode channel.

BRIEF DESCRIPTION OF THE DRAWINGS

In the following, the invention will be described in closer detail with reference to the accompanying drawings, in which.

DETAILED DESCRIPTION OF A PREFERRED EMBODIMENT OF THE INVENTION

The invention is intended to be applied particularly to a TETRA mobile radio system (TETRA=Trans–European Trunked Radio). The direct mode channel structure of the TETRA system is based on both the repeater and the mobile station transmitting and receiving on the same frequency. The system employs a time division frame structure. The frame structure is maintained on the direct mode channel as strictly as possible. This results in that no transmission is allowed on the direct mode channel at a random moment of time, but it is imperative to confine transmissions to the correct time slots. The frame structure helps to achieve not only single frequency operation but also that reception on the direct mode channel is necessary in predetermined frames and time slots only. Hence, by using a time division direct mode channel, it is possible to save battery capacity of the mobile stations. A repeater or mobile station switching onto a direct mode channel should always check, before transmitting, whether the channel is free. The mobile stations are able to maintain the frame structure even if no speech or data traffic is present. The same holds true as far an active repeater is concerned. By transmitting an identifier according to the invention, it maintains the frame structure and reserves the direct mode channel. It reserves for itself an exclusive right to operate as a repeater on the direct mode channel and may restrict the number of groups/individual identifiers that may operate under control of the repeater.

Figure 1:
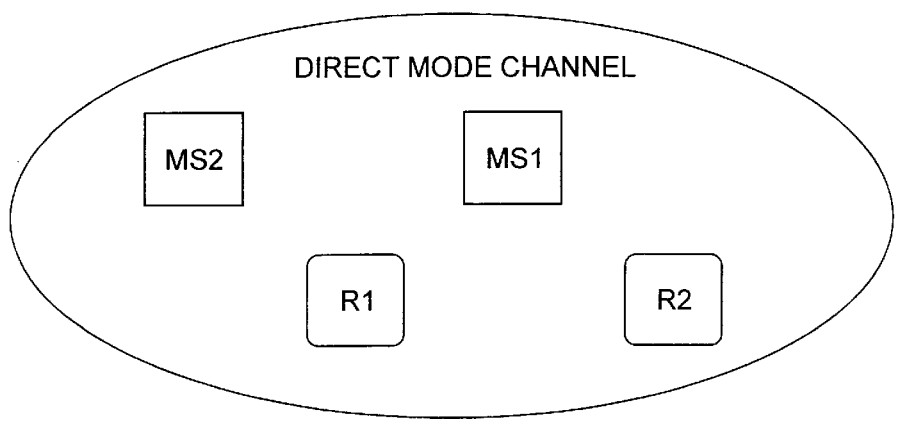
FIG. 1 shows a functional diagram of the operation on a direct mode channel of the repeater according to the invention.

FIG. 1 is a functional diagram of the operation on a direct mode channel of the repeater according to the invention. At first, there are mobile stations MS1 and MS2 as well as a first repeater R1 on the direct mode channel. The repeater R1 transmits its identifier to the direct mode channel at, for example, regular intervals T. If an attempt is made for activating the second repeater R2 onto the same direct mode channel, the repeater R2 should monitor the traffic on the direct mode channel for at least the time period T; otherwise it might happen that the second repeater R2 started transmitting on the direct mode channel simultaneously with the first repeater R1. If the second repeater R2 does not detect within the time T the identifier of the first repeater R1 or that of any other repeater, the second repeater R2 may begin to transmit its identifier to the direct mode channel at regular intervals T, and begin to operate as a repeater on that channel. If, however, the second repeater R2 does detect within time T the identifier of the first repeater R1, or that of any other repeater on the direct mode channel, the second repeater R2 may operate according to any of the three embodiments of the invention.

In the first embodiment of the invention, the second repeater R2 may stay on the direct mode channel "in reserve" to await for when there are no more identifiers present on the direct mode channel from other repeaters; this may be the case due to the exit of the first repeater R1, its destruction or its moving further away from the second repeater R2.

In the second embodiment of the invention, the second repeater R2 may select a second direct mode channel on which it seeks to start to operate as a repeater by employing a similar method as it would employ in switching onto the first direct mode channel.

The third embodiment is associated with a situation in which the direct mode channel is in use by a specific communication group. In such a case, the first repeater must, in addition to the identifier of its own, transmit an identifier that indicates the identifier of the communication group that has reserved the direct mode channel. The identifier of the repeater and the identifier of the group that has reserved the direct mode channel may be transmitted in one identifier or in two separate identifiers. The identifier of the communication group that has reserved the direct mode channel is transmitted until the moment of time T1. The repeater transmits its identifier until the moment of time T2, where T2−T1>0.

Figure 2:
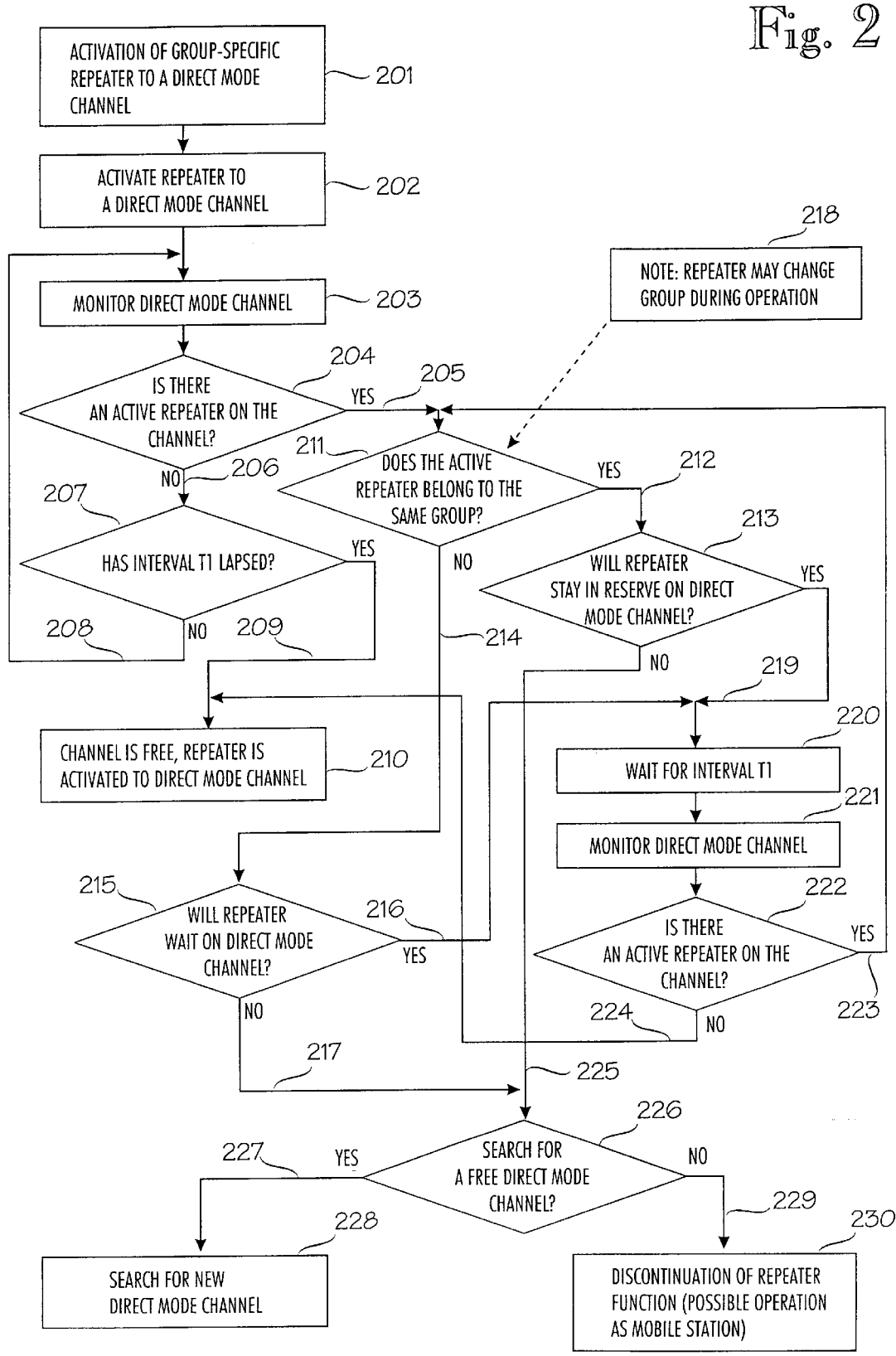
FIG. 2 is a flow chart illustration of the operation of the repeater according to the invention.

FIG. 2 is a flow chart illustrating the operation of the repeater according to the invention. In step 201, a decision is made to activate a repeater onto a direct mode channel. The repeater may be activated, for example, communication group specifically, as in step 201. In the following step 202, the repeater is activated onto the direct mode channel, and the repeater begins to monitor 203 the direct mode channel. The repeater monitors and checks 204 whether there is already another active repeater on the direct mode channel. If there is no 206 other repeater on the direct mode channel, the repeater seeking to switch onto the direct mode channel checks whether the interval T1 has lapsed 207. If it has not 208, the process returns to step 203. If, however, the interval Ti has lapsed, the repeater detects that the direct mode channel is free, and the repeater is activated 210 onto the direct mode channel. If, however, it has been noted in step 204 that there is 205 an active repeater on the direct mode channel, it is examined in step 211 whether the active repeater on the channel serves the same communication group as would the repeater seeking to switch onto the direct mode channel. If the repeater that is already on the direct mode channel serves 212 the same group as the repeater seeking to switch onto the channel, it is considered 213 whether the repeater seeking to switch onto the channel should stay in reserve to wait for the channel to become free. If the repeater does not stay in reserve 225, it is next examined 226 whether a free direct mode channel can be found elsewhere, and if one can be found 227, the repeater switches 228 onto the new direct mode channel and seeks to begin to operate as a repeater there. If a view is taken that no free channel will be searched 229, the operation of the repeater is discontinued 230, whereby it is possible for the repeater to start to operate as a mobile station.

If, on the other hand, the repeater decides to stay 219 in reserve, it waits 220 for the interval T1, after which the repeater again monitors 221 the direct mode channel for a desired time, and checks 222 whether there is an active repeater on the channel already. If there is no active repeater on the channel, the process proceeds to step 210, in which it is noted that the channel is free, and said repeater is activated onto the direct mode channel. If, on the other hand, it is noted in step 222 that there is 223 already an active repeater on the channel, the process proceeds to step 211 from which it continues either to step 213 as described above in case the active repeater on the direct mode channel is of the same group, or if the active repeater on the direct mode channel is not 214 a repeater of the same communication group, it is considered in step 215 whether the repeater should wait on the direct mode channel for the repeater that was first on the direct mode channel to leave the channel. If the repeater decides to wait 216, the process proceeds to step 220, i.e. a wait state. If, on the other hand, it is decided that the repeater is not to wait on the direct mode channel, the process proceeds to step 226 in which it is considered whether a new direct mode channel is to be searched.

Figure 3:
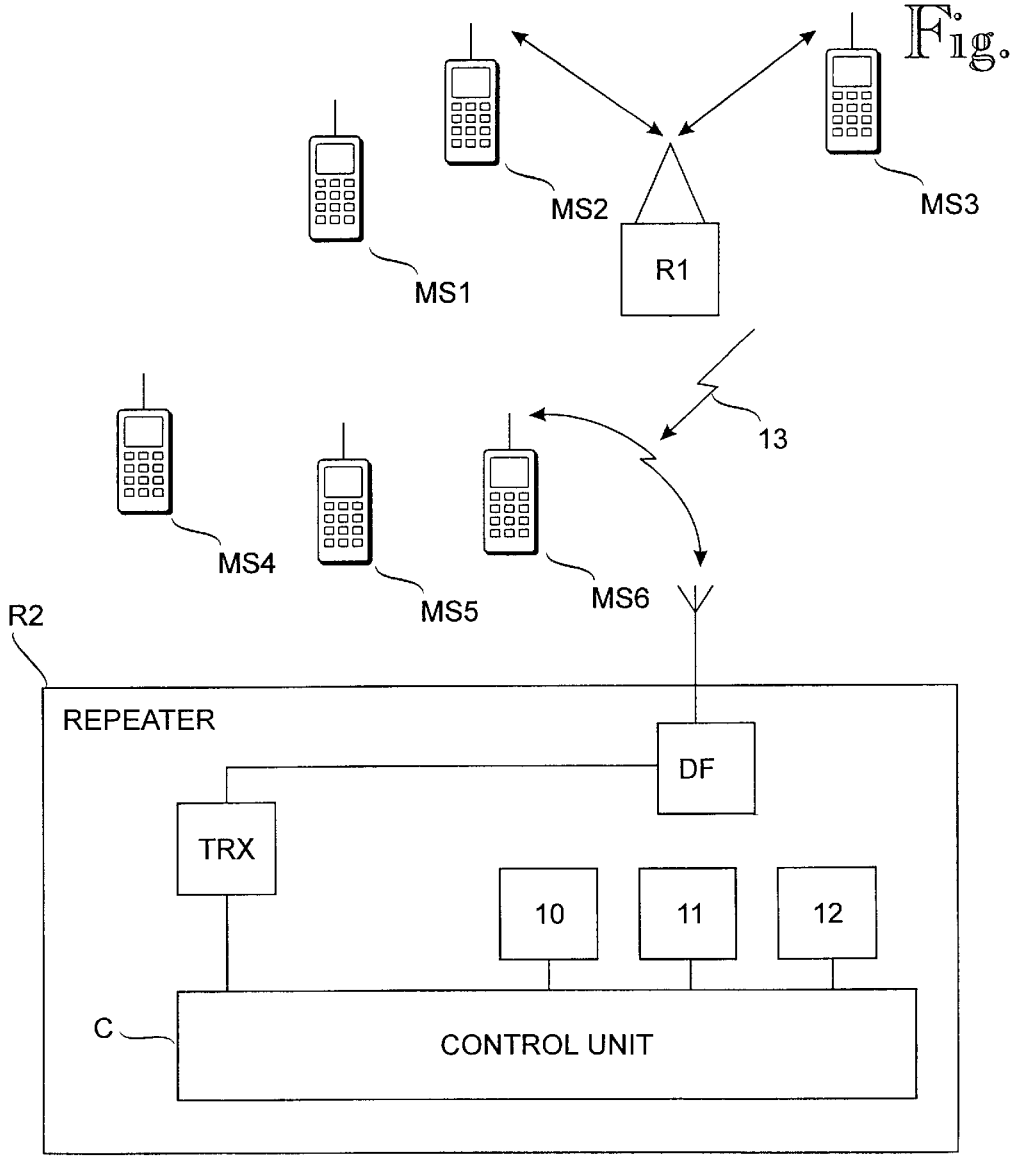
FIG. 3 shows a block diagram of the repeater station according to the invention.

FIG. 3 is a block diagram illustration of the repeater station according to the invention. The radio repeater station of the invention is locally employed for both expanding the coverage of the communication system to outside the base station range and for amplifying the transmissions of mobile-to-mobile traffic on the direct mode channels.

The repeater station according to the invention may interconnect to the entire mobile radio system which comprises at least one base station BS having control and traffic channels which have uplink and downlink frequencies. The exchanges of the mobile radio system may connect the various base stations of the whole mobile radio system to other communication networks. The mobile radio system furthermore comprises mobile stations MS1, MS2, MS3, MS4, MS5 and MS6 communicating on a direct mode channel. In addition, the mobile radio system comprises a repeater station R1 for the purpose of forwarding traffic between the mobile stations MS1, MS2 and MS3, and possible traffic T1 between these mobile stations and the base station BS.

FIG. 3 illustrates the principle features of the repeater (repeater station) according to the invention. The repeater consists of a transceiver unit TRX, a possible duplex filter DF, and a control unit C. The control unit C controls the operation of the transceiver and routes audio signals that have been received or are to be transmitted. Via the radio path, the mobile stations MS4–MS6 belonging to, for example, the same communication group are connected to the repeater.

The repeater station of the invention is characterized in that the transmission of the repeater R1 forwarding radio messages on a direct mode channel contains at desired intervals the identifier 13 of the repeater, the identifier indicating that the repeater forwards traffic on the direct mode channel, and that the repeater is arranged to monitor the direct mode channel as it seeks to switch onto the direct mode channel and to switch onto the direct mode channel only if no identifier from any other repeater has occurred on the direct mode channel within a predetermined monitoring period.

According to the first embodiment of the invention, the repeater R2 is arranged to stay monitoring the direct mode channel at desired intervals if an identifier from any other repeater (for example, that of repeater R1) occurs on the direct mode channel during a predetermined monitoring period. This means that the repeater R2 waits for the end of transmission of the other repeater R1 before the repeater R2 begins to operate as a repeater on the direct mode channel.

According to the second embodiment of the invention, the repeater R2 is arranged to tune onto a second direct mode channel, begin to monitor the second direct mode channel, and seek to begin to operate as a repeater on the second direct mode channel if an identifier of any other repeater R1 occurs on the first direct mode channel within a predetermined monitoring period.

According to the third embodiment of the invention, the repeater R2 is arranged to shift to wait state to monitor at desired intervals the direct mode channel, and to wait until the other repeater R1 that previously repeated traffic of the first communication group on the direct mode channel has left the direct mode channel, and if there is no other traffic on the direct mode channel, the repeater R2 then begins to operate as the repeater of the second communication group on the direct mode channel.

The repeater R2 of the invention is further characterized in that it comprises monitoring means 10 for monitoring the direct mode channel for a desired time, and for detecting an identifier transmitted by any other repeater on the direct mode channel. It is possible that the monitoring means are arranged to monitor the direct mode channel at predetermined intervals.

The repeaters according to all the embodiments are characterized in that they comprise means 11 for transmitting the identifier of the repeater onto the direct mode channel at desired intervals.

The direct mode channel function is designed to function in a group call environment so that a mobile station reserves a direct mode channel for the use of the group it belongs to for the duration of the-call. The term "group" here refers to a specific group identifier which the mobile stations monitor. An open direct mode channel function is achieved by creating one "open" group for all the mobile-stations. When the mobile station has discontinued transmitting, it transmits a channel reservation signal at specific intervals thus indicating that the channel is still reserved for the group.

The repeater station R1, R2 is to inform in its identifier the same information, i.e. the group for which the channel is reserved. This means that it is not possible to start a call of any other group on this direct mode channel in the coverage area of this repeater station. A "call" here can also refer to another kind of setup-transmission-hangtime procedure, for example data transfer or some other data call.

The identifier of the communication group that has reserved the direct mode channel is transmitted until the moment of time T1. The repeater transmits its identifier until the moment of time T2, where T2>T1>0. This means that the repeater station transmits within its identifier information on whether the channel has been reserved for a communication group, and if so, for which. The repeater station may change the contents of its identifier by changing the channel reservation information to "not is reserved" when the reservation time (moment of time T1) has lapsed, i.e. the mobile station does not transmit reservation any more.

The identifier of the communication group is transmitted by the mobile station. The repeater station repeats in its identifier the contents of the identifier, i.e. the information on whether the channel is reserved, and if it is, the group-identifier of the group that has reserved the channel.

In addition, the repeater station may permanently be reserved for some communication group or groups. In such a case, the repeater station should always inform of the identifiers of the communication group/groups whose transmissions it agrees to repeat. In addition, the identifier of the communication group that has reserved the channel at the moment in question should be indicated, as described above. The repeater switching onto the channel utilizes this information in making the decision on whether the direct mode channel is reserved for another communication group. It is possible that a communication group (or groups) has (have) also been reserved for the repeater switching onto the direct mode channel.

According to the first embodiment of the invention, i.e. in a case in which the repeater shifts to wait state, the direct mode channel is reserved for some other communication group than the one of the repeater station seeking to switch onto the channel. In such a case, the repeater station is therefore unable to begin repeating upon the end of transmission by the active repeater station before the channel is free for a communication group or groups of its own.

In the identifier transmitted by the repeater station on the direct mode channel, other information may also be transmitted than just the identifier of the repeater. These include, for example, the power level used by the repeater, the maximum transmitting power of the mobile stations, the identifiers of the communication group(s), the identifiers/number of the repeater stations in reserve, or dual watch indication, i.e. information on that the mobile station may be in a state in which it simultaneously monitors the system channels and the direct mode channels.

According to a further embodiment of the invention, a repeater station simultaneously operating as a mobile station could operate in a normal mobile station state when an active repeater station already occupies the direct mode channel. When, for some reason, the transmission of the active repeater cannot any more be decoded by the repeater station/mobile station "in reserve", the mobile station shifts to repeater station state. During the shift, random access may be utilized. In practise, the repeater station and the mobile station denote the very same concept, the repeater station being just a special model of a mobile station. Thus, the invention has a special feature of the repeater station operating in reserve so that the repeater operates as a normal mobile station monitoring the transmission of the repeater station. The end of transmission from the repeater station initiates the repeater station function.

According to yet another embodiment of the invention, the active repeater station indicates by a specific signal that it will discontinue operating as a repeater. This makes it possible for the mobile station in reserve to begin operating as a repeater without delay. Otherwise it would be uncertain whether the active repeater has truly discontinued operating as a repeater, or whether there is interference, a shadow area or alike. For such a case, a specific monitoring time has been determined, which will set the delay employed before a new repeater starts to operate in order to make it sure that the operation of the previous repeater has truly come to a halt.

The drawings and their description are only intended to illustrate the idea of the present invention. The details of the repeater of a mobile radio system and the method for using it may vary within the scope of the claims. Although the invention is above described in relation to TETRA mobile radio system, the invention can be applied to other kind of mobile radio systems.

We claim:

1. A method for using direct mode repeaters in a time division based synchronously operating digital mobile radio system which has a first repeater operating as a repeater forwarding transmissions between two or more mobile stations on a direct mode channel, and a second repeater which does not at first operate as a repeater, said repeaters being arranged for direct mode operation in which said transmissions are received by one of said direct mode repeaters, directly from a first mobile station, and said one of said repeaters forwards said transmissions directly to a second mobile station, said method comprising:

(a) transmitting from said first repeater, an identifier, which identifies said first repeater, during respective time periods at desired intervals on a direct mode channel;

(b) said second repeater monitoring said direct mode channel for at least each said time period; and (c) said second repeater shifting to a wait state, but continuing said monitoring of said direct mode channel during said time periods at said desired intervals, if said second repeater as a consequence of said monitoring in step (b) detects said identifier, which identifies said first repeater, on said direct mode channel, and said second repeater waiting in said wait state to detect as a consequence of said monitoring, an end of transmission from said first repeater before beginning to operate as a repeater on said direct mode channel.

2. A method for using direct mode repeaters in a time division based synchronously operating digital mobile radio system which has a first repeater operating as a repeater forwarding transmissions between two or more mobile stations on a first direct mode channel, and a second repeater which does not at first operate as a repeater on said first direct mode channel, said repeaters being arranged for direct mode operation in which said transmissions are received by one of said direct mode repeaters, directly from a first mobile station, and said one of said repeaters forwards said transmissions directly to a second mobile station, said method comprising:

said second repeater maintaining a list of identifiers of direct mode channels possibly useable for repeating by said second repeater, said list including said first direct mode channel and a second direct mode channel;

transmitting from said first repeater, an identifier, which identifies said first repeater, on said first direct mode channel during respective time periods at desired intervals;

said second repeater monitoring said first direct mode channel for at least each respective said time period; and said second repeater retrieving an identifier, which identifies said second direct mode channel, and turning onto said second direct mode channel, said second repeater starting to monitor said second direct mode channel, and said second repeater seeking to begin operating on said second direct mode channel as a repeater, if said second repeater as a consequence of said monitoring, detects said identifier, which identifies said first repeater, on said first direct mode channel.

3. A method for using direct mode repeaters in a time division based synchronously operating digital mobile radio system which has a first repeater operating as the repeater for a first communication group of mobile stations on a direct mode channel, and a second repeater reserved for a second communication group, said second repeater does not at first operate as a repeater, said repeaters being arranged for direct mode operation in which transmissions are received by one of said direct mode repeaters, directly from a respective first mobile station, and said one of said repeaters forwards said transmissions directly to a respective second mobile station, said method comprising:

transmitting from said first repeater an identifier, which identifies said first repeater, on a direct mode channel during respective time periods at desired intervals;

said second repeater monitoring said direct mode channel for at least each said time period; and said second repeater shifting to a wait state, if said second repeater as a consequence of said monitoring detects said identifier, which identifies said first repeater, on said direct mode channel, said second repeater in said wait state continuing said monitoring of said direct mode channel during said time periods and waiting in said wait state to detect, as a consequence of said monitoring, leaving of said direct mode channel, before beginning to operate as a repeater for said second communication group on said direct mode channel.

4. A direct mode repeater for forwarding traffic between mobile stations which are arranged for synchronously communicating digitally on a first direct mode channel in respective time slots, said repeater being arranged for direct mode operation in which radio messages are received by said direct mode repeater, directly from a first mobile station, and said direct mode repeater forwards said radio messages directly to a second mobile station, said repeater comprising:

a transceiver unit which for wards said radio messages between respective ones of said mobile stations while such mobile stations are communicating on said first direct mode channel;

a control unit which controls operation of said repeater and which directs said transceiver unit to said direct mode channel;

said transceiver being arranged to transmit transmissions on said direct mode channel that forwards radio messages on said first direct mode channel which contain, in respective time periods, at desired intervals an identifier, which identifies said repeater, indicating that said repeater forwards traffic on said first direct mode channel; and said repeater monitoring said first direct mode channel as said repeater is seeking to switch onto said first direct mode channel, and switching onto said first direct mode channel only if as a result of monitoring, said repeater detects that no identifier from any other repeater has occurred on said first direct mode channel during a predetermined monitoring period.

5. The direct mode repeater as claimed in claim 4, said repeater further comprising:

said repeater waiting in a wait state and continuing to monitor said first direct mode channel at desired intervals, if as a result of said monitoring, said repeater detects that an identifier, which identifies any other repeater, occurs on said first direct mode channel during said predetermined monitoring period, and waiting in said wait state for the end of transmission of said any other repeater before beginning to operate as a repeater on said first direct mode channel.

6. The direct mode repeater as claimed in claim 5, said repeater further comprising:

a monitor which performs said monitoring, and a detector which detects, as a result of said monitoring, an identifier transmitted by any other repeater on the respective said direct mode channel.

7. The direct mode repeater as claimed in claim 6, wherein said monitor monitors the respective said direct mode channel at said predetermined intervals.

8. The direct mode repeater as claimed in claim 5, said repeater further comprising:

a transmitter which transmits an identifier, which identifies said repeater, onto the respective said direct mode channel at predetermined intervals.

9. The direct mode repeater as claimed in claim 4, said repeater further comprising:

said repeater tuning onto a second direct mode channel, to begin to monitor said second direct mode channel, and seeking to begin to operate as a repeater on said second direct mode channel, if as a result of said monitoring of said first direct mode channel said repeater detects that an identifier, which identifies any other repeater, occurs on said first direct mode channel within said predetermined monitoring period.

10. The direct mode repeater as claimed in claim 9, said repeater further comprising:

a monitor which performs said monitoring, and detector which detects, as a result of said monitoring, an identifier transmitted by any other repeater on the respective said direct mode channel.

11. The direct mode repeater as claimed in claim 9, said repeater further comprising:

a transmitter which transmits an identifier, which identifies said repeater, onto the respective said direct mode channel at predetermined intervals.

12. The direct mode repeater as claimed in claim 4, said repeater further comprising:

said repeater shifting to a wait state while continuing to monitors at desired intervals, said first direct mode channel waiting on said wait state until said repeater as a result of said monitoring detects that another repeater that previously repeated traffic of a first communication group on said first direct mode channel has left said direct mode channel; and, if said repeater as a result of said monitoring, detects that there is no other repeater traffic on said first direct mode channel, to begin to operate as a repeater for a second communication group on said first direct mode channel.

13. The direct mode repeater as claimed in claim 12, said repeater further comprising:

a monitor which performs said monitoring, and a detector which detects, as a result of said monitoring, an identifier transmitted by any other repeater on the respective said direct mode channel.

14. The direct mode repeater as claimed in claim 13, wherein said monitor monitors the respective said direct mode channel at said predetermined intervals.

15. The direct mode repeater as claimed in claim 12, said repeater further comprising:

a transmitter which transmits an identifier, which identifies said repeater, onto the respective said direct mode channel at predetermined intervals.

16. The direct mode repeater as claimed in claim 4, said repeater further comprising:

a monitor which performs said monitoring, and a detector which detects, as a result of said monitoring, an identifier transmitted by any other repeater on the respective said direct mode channel.

17. The direct mode repeater as claimed in claim 16, wherein said monitor monitors the respective said direct mode channel at said predetermined intervals.

18. The direct mode repeater as claimed in claim 17, said repeater further comprising:

a transmitter which transmits an identifier, which identifies said repeater, onto the respective said direct mode channel at predetermined intervals.

19. The direct mode repeater as claimed in claim 10, said repeater further comprising:

a transmitter which transmits an identifier, which identifies said repeater, onto the respective said direct mode channel at predetermined intervals.

20. The direct mode repeater as claimed in claim 4, said repeater further comprising:

a transmitter which transmits an identifier, which identifies said repeater, onto the respective said direct mode channel at predetermined intervals.

21. The direct mode repeater as claimed in claim 20, said repeater further comprising:

a monitor which performs said monitoring, and a detector which detects, as a result of said monitoring, an identifier transmitted by any other repeater on the respective said direct mode channel.

* * * * *

UNITED STATES PATENT AND TRADEMARK OFFICE
CERTIFICATE OF CORRECTION

PATENT NO.    : 6,052,557
DATED         : April 18, 2000
INVENTOR(S)   : Kinnunen et al.

It is certified that error appears in the above-identified patent and that said Letters Patent is hereby corrected as shown below:

<u>Title page,</u>
Item [73], change the Assignee from "Nokia Telecommunication Oy" to -- Nokia Telecommunications Oy --.

Signed and Sealed this

Sixteenth Day of October, 2001

Attest:

NICHOLAS P. GODICI
*Attesting Officer*     *Acting Director of the United States Patent and Trademark Office*